United States Patent
Brunswig et al.

(10) Patent No.: US 7,840,944 B2
(45) Date of Patent: Nov. 23, 2010

(54) ANALYTICAL REGRESSION TESTING ON A SOFTWARE BUILD

(75) Inventors: Frank Brunswig, Heidelberg (DE); Jens Kaiser, Kraichtal (DE)

(73) Assignee: SAP AG, Walldorf (DE)

( * ) Notice: Subject to any disclaimer, the term of this patent is extended or adjusted under 35 U.S.C. 154(b) by 1427 days.

(21) Appl. No.: 11/170,940

(22) Filed: Jun. 30, 2005

(65) Prior Publication Data
US 2007/0006041 A1  Jan. 4, 2007

(51) Int. Cl.
G06F 9/44 (2006.01)
G06F 11/00 (2006.01)

(52) U.S. Cl. .............. 717/124; 717/120; 717/122; 714/38

(58) Field of Classification Search .............. None
See application file for complete search history.

(56) References Cited

U.S. PATENT DOCUMENTS

| | | | |
|---|---|---|---|
| 6,182,245 B1* | 1/2001 | Akin et al. ............ 714/38 |
| 6,266,788 B1* | 7/2001 | Othmer et al. .......... 714/38 |
| 6,298,476 B1* | 10/2001 | Misheski et al. ........ 717/101 |
| 6,542,841 B1* | 4/2003 | Snyder ................. 702/104 |
| 6,988,139 B1* | 1/2006 | Jervis et al. ........... 709/226 |
| 7,249,354 B2* | 7/2007 | Tigani et al. ........... 717/177 |
| 2003/0093716 A1* | 5/2003 | Farchi et al. .......... 714/34 |
| 2003/0233600 A1* | 12/2003 | Hartman et al. ........ 714/32 |
| 2004/0015866 A1* | 1/2004 | Estep et al. ........... 717/124 |
| 2004/0054492 A1* | 3/2004 | Hagerott et al. ........ 702/120 |
| 2004/0153830 A1* | 8/2004 | Cebula et al. ......... 714/38 |
| 2004/0194060 A1* | 9/2004 | Ousterhout et al. ..... 717/120 |
| 2005/0081186 A1* | 4/2005 | Tigani et al. .......... 717/101 |
| 2006/0168565 A1* | 7/2006 | Gamma et al. ......... 717/122 |
| 2006/0212540 A1* | 9/2006 | Chon et al. ........... 709/218 |
| 2006/0259869 A1* | 11/2006 | Hewitt et al. ......... 715/762 |
| 2007/0006041 A1* | 1/2007 | Brunswig et al. ...... 714/38 |
| 2008/0010074 A1* | 1/2008 | Brunswig et al. ...... 705/1 |
| 2008/0147455 A1* | 6/2008 | Brunswig et al. ...... 705/7 |

OTHER PUBLICATIONS

Minna Mäkäräinen, "Software Change Management Processes in the Development of Embedded Software", Aug. 26, 2000, VTT Electronics, Technical Research Centre of Finland, ESPOO 2000, pp. 1-185.*
CruiseControl Home, Cruise Control, http://cruisecontrol.sourceforge.net/, [retrieved from internet on Jun. 28, 2005], p. 1.

(Continued)

*Primary Examiner*—Michael J Yigdall
*Assistant Examiner*—Ben C Wang
(74) *Attorney, Agent, or Firm*—Fountainhead Law Group PC (57) ABSTRACT

Methods and apparatus, including computer program products, for testing software involve generating a software build of source files and initiating tests on the software build. Each test is performed using a portion of the software build that corresponds to one or more of the source files. Results data relating to the tests, such as an indication of errors identified in the tests, is stored. The results data further identifies source files associated with each of the tests. A notification message relating to the results data is sent to a user.

20 Claims, 3 Drawing Sheets

OTHER PUBLICATIONS

Urban Code, Anthill Build Management Server—Build and Release Management Tool, http://www.urbancode.com/projects/anthill/default.jsp, [retrieved from internet on Jun. 28, 2005], pp. 1-3.

PushToTest—Free open-source software test automation soloutions, Now I know how to do SOA right., http://pushtotest.com/, [retrieved from internet on Jun. 28, 2005], pp. 1-2.

Automated QA, TestComplete—Automated Software Testing Tool, TestComplete 3—more "bang for the buck" in automated testing., http://www.automatedqa.com/products/testcomplete/index.asp, [retrieved from internet on Jun. 28, 2005], pp. 1-3.

Segue, Step up the pace of functional & regression testing, Silk Test, http://www.segue.com/products/functional-regressional-testing/silktest.asp, [retrieved from internet on Jun. 28, 2005], pp. 1-2.

IBM, IBM Software—Rational Functional Tester—Product Overview, Rational Functional Tester, http://www-306.ibm.com/software/awdtools/tester/functional/, [retrieved from internet on Jun. 28, 2005], pp. 1-2.

Mercury, Regression Testing—Mercury WinRunner™, http://www.mercury.com/us/products/quality-center/functional-testing/winrunner/, [retrieved from Internet on Jun. 28, 2005], p. 1.

Mercury Interactive, White Paper, Web Performance Management Solutions for Wireless Applications, http://www.mercury.com/us/website/pdf-viewer/?url=/us/pdf/products/whitepapers/wap.pdf, [retrieved from internet on Jun. 28, 2005], pp. 1-17.

Mercury Interactive, The Complete Testing Solution for SAP R/3, http://www.mercury.com/us/website/pdf-viewer/?url=/us/pdf/products/sap.pdf, [retrieved from Internet on Jun. 28, 2005], pp. 1-4.

Mercury WinRunner, Learn more about Mercury WinRunner™ by reading the latest white papers and fact sheets, http://www.mercury.com/us/products/quality-center/funtional-testing/winrunner/papers.html, [retrieved from internet on Jun. 28, 2005], p. 1.

Mercury Interactive, White Paper, Testing Java Applets and Applications, http://www.mercury.com/us/website/pdf-viewer/?url=/us/pdf/products/javawp0299.pdf, [retrieved from internet on Jun. 28, 2005], pp. 1-10.

Mercury Interactive, The Complete Testing Solution for Oracle Applications, http://www.mercury.com/us/website/pdf-viewer/?url=/us/pdf/products/oracle.pdf, [retrieved from internet on Jun. 28, 2005], pp. 1-4.

Mercury WinRunner, http://www.mercury.com/us/website/pdf-viewer/?url=/us/pdf/products/datasheets/DS-0504-winrunner.pdf, [retrieved from internet on Jun. 28, 2005], pp. 1-2.

* cited by examiner

ANALYTICAL REGRESSION TESTING ON A SOFTWARE BUILD

BACKGROUND

The present invention relates to data processing by digital computer, and more particularly to analysis of regression tests on a software build.

Computer software applications often are developed though a trial-and-error testing process. In such a process, an application is written and the behavior of the application is tested. The application is modified based on the tested behavior, and the modified application is retested. Testing the application after a modification has been made is useful for determining whether bugs in the application have been fixed, that the addition or modification of source code has not introduced errors, and that the modified code complies with specific requirements with which the test is designed to verify compliance. Such testing may be referred to as "regression testing."

Regression testing of software applications is used to facilitate quality management during development. Many different tools, representing different test approaches, can be used in regression testing. For example, different tools and methods may be used for dynamic and static testing (e.g., for testing performance of the application under changing and constant conditions), for black and white box testing (e.g., for performing tests on whether a correct output is produced for certain inputs and performing tests that further determine whether the correct operations are performed to produce the output), for configuration of the test environment, and for reporting and notification relating to the test results.

SUMMARY

The present invention provides methods and apparatus, including computer program products, that implement techniques for testing software builds.

In one general aspect, the techniques feature initiating tests on a software build. Each test is performed using a portion of the software build that corresponds to one or more source files. Results data relating to the tests is stored. The results data further identifies source files associated with each of the tests.

The invention can be implemented to include one or more of the following advantageous features. Intermittent builds, one of which is the software build, are initiated using access to a source repository. The intermittent builds are initiated in accordance with a schedule. A notification is sent to a user associated with a revision between successive intermittent builds based on results of one or more of the tests. Each intermittent build is configured in accordance with stored configuration data adapted to provide a consistent configuration for different ones of the intermittent builds. The tests are initiated on each of the intermittent builds to produce a set of results data for each intermittent build, and the sets of results data are analyzed to identify correlations between the sets of results data. The sets of results data and data identifying the correlations are stored in a results repository. The data stored in the results repository is filtered in response to a user request, and a user is provided with access to the filtered data through a user interface. The instructions are written in a scripting language.

In another general aspect, a build of software source files is generated, and a set of tests are performed on the build. The set of tests are performed intermittently on successive builds of the software source files. An error is identified based on a test from the set of tests on the build. The error relates to a revision relative to a prior build. A notification message of the error is sent to a user associated with the revision in response to identifying the error.

The invention can further be implemented to include one or more of the following advantageous features. Successive builds of a software application are generated using source code from a source repository that stores discrete sources. Each successive build includes one or more revisions to one or more of the discrete sources, and the user associated with the revision is a developer of a discrete source that includes the revision. The user associated with the revision is identified based on a role associated with the user and with the error. The revision is identified based on a revision log containing information relating to revisions since the prior build. Generating the build of the software source files and performing the set of tests on the build are initiated in response to a trigger from a scheduling module. The notification message is sent based on a subscription associated with the user.

In yet another general aspect, test assets are stored for use in performing tests, and tests on software builds are initiated in accordance with a schedule. Results data relating to results of the tests is stored. Analyses on the results data are performed, and information from the analyses is selectively reported.

The invention can further be implemented to include one or more of the following advantageous features. Notifications are sent based on the analyses of the results data. The software builds are generated using a plurality of sources. The test assets are stored in a test repository, and the tests are initiated by a scheduler. The results data is stored in a results repository, and the analyses are performed by a reporting module. The reporting module selectively reports the information from the analyses by applying a filter selected by through a user interface.

The invention can be implemented to realize one or more of the following advantages. Test methodologies and test tools can be integrated seamlessly during the software development and product life cycle and in a manner that facilitates extensibility. Results of regression tests are stored and can be accessed through queries. Test results can be analyzed periodically to find relationships between successful and unsuccessful tests, which help avoid similar software errors in the future and to identify potential quality issues as early as possible. These analyses can also be used to evaluate objective quality characteristics that focus not only on problematic software quality properties (e.g., errors) but also on attributes that demonstrate good qualities (e.g., user-friendliness). Testing can be at least partially automated, can be more conveniently managed, and responsible parties can be automatically notified of errors and other test results. Based on the priority of errors or the priority of the tested system, different notifications are possible, such as SMS, phone, mail, etc. Historical configurations and component data can be stored to enable reproducible test environments. Features of the invention can be used to facilitate test planning. One implementation of the invention provides all of the above advantages.

Details of one or more implementations of the invention are set forth in the accompanying drawings and in the description below. Further features, aspects, and advantages of the invention will become apparent from the description, the drawings, and the claims.

DESCRIPTION OF DRAWINGS

Like reference numbers and designations in the various drawings indicate like elements.

DETAILED DESCRIPTION

Figure 1:
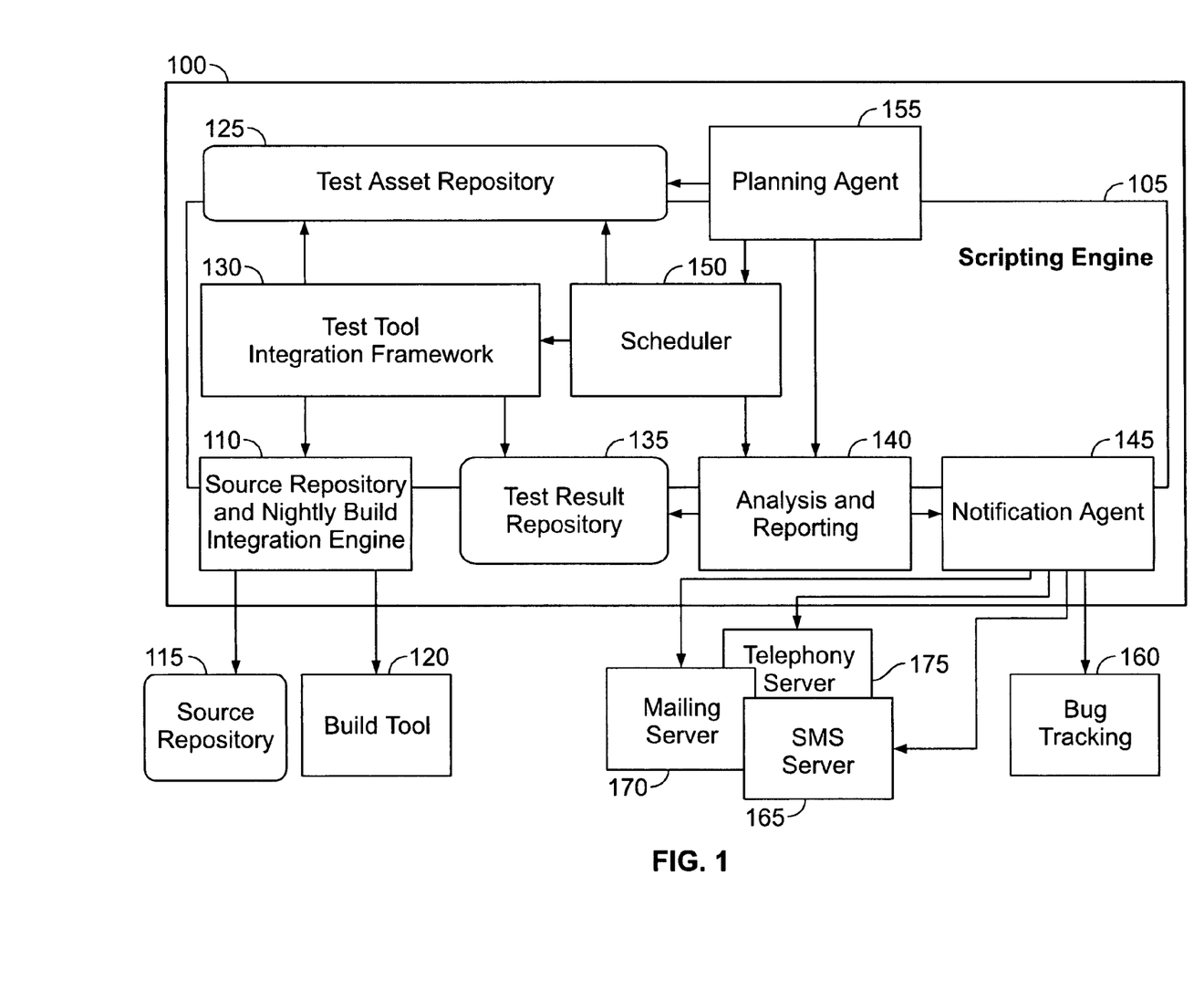
FIG. 1 is a block diagram of an analytical regression test system.

FIG. 1 is a block diagram of an analytical regression test system 100. The system 100 provides an integrated and automated solution for performing regression tests and analyzing and reporting test results. In general, the system 100 automates and coordinates a collection of different regression tests that are performed on a software application during a development process and/or throughout the life cycle of the software application. Thus, instead of developers each introducing and running tests in a relatively incoherent manner, the analytical regression test system 100 provides a centralized and coordinated testing architecture. Results of the regression tests are stored and periodically analyzed to identify problems, to help avoid future errors, and to evaluate software quality.

The components of the analytical regression test system 100 perform different tasks and are implemented, at least in part, using a high-level interpreted programming or scripting language, such as JavaScript™, Visual Basic™, Perl™, and the like. For example, each component can support a scripting application programming interface so that it is possible to describe complex batches to be handled by the different components using a scripting language. Accordingly, each of the components in the analytical regression test system 100 can use a scripting engine 105 that operates to execute the batches. The use of a scripting language also facilitates extensibility of the analytical regression test system 100.

The analytical regression test system 100 includes a source repository and nightly build integration engine 110 that serves as an interface to abstract source repositories 115. The source repositories are abstract in that they potentially can be stored or maintained in any location accessible by the source repository and nightly build integration engine 110 and are not necessarily limited to some predefined set of source files. The source repositories 115 contain discrete sources, such as the software source code, configuration information, resource files, software objects, data, and other source files used in a software application. The source repositories 115 are not limited to storing source files such as classical C™, JAVA™, or Basic™ sources. Source files can also include resource files such as images, audios, movies, and any other kind of documents (word, spreadsheet etc.). Accordingly, in some implementations, a build of software source files can include a substantial portion of or all of the sources necessary to run an application. By using a comprehensive set of sources, effective tests can be performed of applications that typically need a variety of resources to run properly. The references or links to the various resources and the dependencies are also managed in the repositories 115. For example, a software application can incorporate multiple source files that are compiled to generate an executable version of the software application (e.g., a build).

The source repositories can be implemented using, for example, Microsoft's Visual SourceSafe™ or Concurrent Versions System (CVS). The source repositories generally allow developers to store and retrieve different versions of source code throughout the software development cycle and life cycle and enable different versions of source code to be regenerated (e.g., using a record of changes or revisions to the source code). Accordingly, developers can, among other things, reconstruct historical software builds and/or create new builds using prior versions of one or more source files. In some implementations, a list of changes is maintained for each source file. Thus, as developers modify a source file to make new revisions, the list of changes can be used to determine what changes were made and by whom each day or each time a new version of the source file is saved. Using a change number, which identifies a development level (i.e., a state of development) of the source file, it is possible to set a software system back to a specific state.

The source repository and nightly build integration engine 110 also serves as an interface to a build tool 120 that automates a process of compiling the various source files for a software application to generate a build. The build tool 120 can be, for example, Make, Ant, or some other build tool. In general, a build can be generated by the build tool 120 on a periodic basis (e.g., daily) or can be manually initiated (e.g., upon completion of a project milestone).

The source repository and nightly build integration engine 110 provides a seamless integration of the source repositories 115 and the build tool 120 and operates to automatically initiate builds by the build tool 120 and to provide any necessary access to the source repositories 115 from the build tool 120. In a typical implementation, the source repository and nightly build integration engine 110 initiates at least a partial build on a nightly basis as directed by a scheduler 150 and/or planning agent 155. In some implementations, however, builds can be initiated on an intermittent basis other than a periodic nightly basis. The source repository and nightly build integration engine 110 monitors the output of the build tool 120 for build failures, which can be reported to one or more developers or other subscribers using a notification component 145. The source repository and nightly build integration engine 110 can also support filters that enable the build tool to generate builds on source files of certain types and formats.

The analytical regression test system 100 also includes a test asset repository 125. The test asset repository 125 provides a central repository for storing regression test scripts, verifications, configurations, and other test assets. In general, test assets can include any digitally stored data or program that can be used to perform or facilitate the performance of tests on a software build, software product, or portions thereof. The tests can include performance tests and resource monitoring and can support various different test scenarios, such as error tests, application programming interface tests, compliance tests, website tests, load tests, static code analysis, and the like. Test scenarios can be release independent and/or a migration tool can be used to adapt existing test scripts for new releases.

By storing test assets in the test asset repository 125, test assets can be shared among different builds of the same software application and among builds of different software applications, and the test asset repository 125 can be used to produce reliable and reproducible test results. New tests that trigger a software bug can be generated and stored when the software bug is reported. Thus, the set of tests in the test asset repository 125 can grow throughout the development process.

Generally, the test asset repository 125 includes tests that are written in a test language, which can be a scripting (e.g., JPython) or compiled language, that is sufficiently robust to enable information to be captured from one test and to be used as an input in one or more other tests of other software functionality and to enable logical decisions emulating user interaction at application branching points. Test sets are generally executable on multiple different platforms. The test asset repository 125 can include configuration data that defines different test configurations for different software releases, builds, or applications. The test asset repository 125 can include one or more databases, locations, and/or physical storage devices.

A test tool integration framework 130 provides an open language and platform independent framework for integrating the various components of the analytical regression test system 100. As with the individual components of the analytical regression test system 100, the test tool integration framework 130 is driven by scripts. The test tool integration framework 130 directs the configuration of tests and other software in accordance with configuration data stored in the test asset repository and triggers the performance of tests on software builds received from the source repository and nightly build integration engine 110. The test tool integration framework 130 can be used to access numerous existing and/or standard tests and to import or generate new tests.

In conventional testing environments, different test tools are frequently incompatible because, for example, some tests are performed at a high level, while others are performed at a source code level. Thus, different portions of builds are used to perform the tests, and the test reports present different and incompatible types of test results. The test tool integration framework 130 enables an integration of different test tools and reports test results in a unified or standardized format. The test tool integration framework 130 stores the test results, including identifications of errors, meta data, additional information, and error categorizations, in a test result repository 135. The test results repository 135 can include one or more databases, locations, and/or physical storage devices and can be extended dynamically. For each test result or set of related test results, the test results repository 135 can include results data, such as links to or other identifying information for the source files (e.g., version and/or build numbers) and the test assets to which the test result relates.

An analysis and reporting module 140 provides a front-end interface for the test results stored in the test results repository 135. The analysis and reporting module 140 can provide access based on a user's particular role in the software development or life cycle process. A role generally relates to the responsibilities assigned to a particular user (e.g., developer, architect, quality manager, and the like) but can include any other basis according to which information is selectively distributed. Thus, different users may have access to different types of test results information, different reports and filters, and different degrees of data aggregation depending on the user's role. Filtering of test results data can allow users to selectively view different types or categories of data or to apply complex filtering rules.

The analysis and reporting module 140 can perform evaluations of test results, such as comparing test results from different builds, aggregating data, data mining, collecting statistics, and identifying correlations, and can support filtering of relevant information. For example, the analysis and reporting module 140 can use data mining techniques to analyze available sets of test results data (e.g., using data sets that have the same basic dimension, such as time or location) to search for correlations between the different data sets, environments, circumstances, and quality characteristics. Correlations can be used, for example, to identify errors that may have the same or similar origins. Such analyses can be performed on a periodic basis, as directed by a scheduler 150 and/or planning agent 155, and the results of the analyses can be stored as additional result data in the test results repository 135 in the form of correlation parameters. These correlation parameters can be used for future analyses. The analysis and reporting module 140 can also perform error tracking to analyze the software infrastructure of a build for purposes of following software branches to which software bugs can be transported.

As an example of the types of correlations that can be identified through data mining, the analysis and reporting module 140 might identify a correlation between the number of source files checked out to and/or changed by a single developer between two consecutive builds and the number of compile errors in the nightly build. By distributing the workload of the single developer among a team of developers in response to such an identified correlation, data mining may reveal that the number of compile errors decreases. As another example, the analysis and reporting module 140 might identify a correlation between a type of error and the day of the week on which the error occurs.

The tests and the analyses of test results can also include a metric of quality characteristics, which can be used to provide a objective measurement of quality. The concept of quality can relate not only to the number of technical errors in the software but also characteristics such as missing but necessary features, poor performance, or a poorly designed user interface. Software quality can be expressed in parameters that quantify errors, workarounds, performance, memory footprints, network loads, response times, user guidance, and other features that may degrade or improve the productivity of a user. The quality parameters can form the dimensions of an n-dimensional space, which can be used to find designs that increase end-user productivity by seeking the extrema (maximum or minimum) in the quality parameter space. Thus, data mining techniques based on test results data can be used to identify ways to improve software quality and the software development process.

The analysis and reporting module 140 can also be used to perform filtering and search functions on the test results data. For example, if a software bug (i.e., an error or defect that causes some type of compile error, runtime error, or other malfunction) occurs, a developer is typically assigned to correct the problem. The fix provided by the developer and the configuration of the system at the time of discovering the bug can each be stored. Subsequently, if another bug occurs, the test results repository 135 can be searched or filtered to identify similar problems that have occurred in the past and to therefore identify possible fixes for the bug. Accordingly, the data mining, filtering, and search functions can be used to determine which tests, configurations, and/or fixes belong to which bug reports.

A notification module 145 enables workflow by sending notifications using, for example, a short message service (SMS) server 165, an email server 170, and/or a telephony server 175. Notifications relating to the performance of tests, test results, analyses, scheduling, builds, source file changes, bug reports, and any other analytical regression test system 100 information can therefore be communicated by SMS, email, telephone, or other forms of electronic, digital, or automated communication to users according to their respective identities and/or roles. The notification module 145 can notify users of status reports periodically generated by the analysis and reporting module 140. Notifications can be sent based on errors that are dynamically categorized in the test results repository 135.

The notification module 145 can also send data to a bug tracking system 160, which can store information relating to software bugs such as identifications of test assets that correspond to the bugs, test results, and source level information (e.g., source and build numbers). For example, an administrator can create a bug report. As a result, the notification module 145 can send the bug report to the bug tracking system 160 and send a notification containing a link to the bug report to a developer. The bug report can include a tag identifying the test, the configuration, and other test assets that lead to the discovery of the bug. The developer can create a fix for the bug, in response to which the notification module 145 can send the fix and/or information identifying the fix to the bug tracking system 160 and to a quality manager.

The notification module 145 can send notifications to users, the bug tracking system, and other recipients using a publish-subscribe mechanism. Thus, users and systems can subscribe to notifications that are of interest to them. In some cases, subscriptions can be assigned by the analytical regression test system 100. For example, a developer that makes a change to a source file can automatically be subscribed to notifications relating to errors in the source file. For purposes of notifying developers of errors, developers that submitted new sources between two consecutive test cycles are responsible for errors that occurred in the latest build and test run. The close integration of the source repositories, the source level information is available and allows the notification module 145 to selectively notify developers and other users based on the identity and/or role (as identified in a user profile) of users that were responsible for revisions in source levels. In addition, after periodic analyses are performed and/or after reports are generated by the analysis and reporting module 140, results of the analyses and/or the reports can be sent to subscribers by the notification module 145.

A scheduling module 150, or scheduler, serves to initiate various events and to control timing of various functions in the analytical regression test system 100. For example, the scheduling module 150 triggers a build and test cycle on an intermittent basis (e.g., nightly or weekly). The scheduling module 150 can control the initiation of builds by the source repository and nightly build integration engine 110, the performance and sequence of tests on the builds using test assets in the test asset repository 125, the operations of the analysis and reporting module 140, and the transmission of notifications from the notification module 145. Events can be scheduled to occur intermittently and can be at regular periods or at varying intervals.

A planning module 155 serves to control the triggering activities of the scheduling module 150. The planning module 155 is used to take into account considerations relating to changes in the state of applications, such as considering restoring baseline test data, creating test plans that cover the key functionality of the software, and understanding how the test tools and the application work together. The planning module 155 can be used to plan when different sets of tests are to be performed. For example, a more extensive set of tests that require a longer test run can be used before milestone releases, while daily tests can use a more limited number of tests. The planning module 155 can further track how much of a software application has been tested on a code level, module level, and class level. Planning can also involve determining which users and/or systems will be notified of various events. Test scripts can be recorded using capture and playback methods and/or coded to properly execute software objects in accordance with a defined test plan that incorporates an understanding of how the test scripts will work with the software objects. The planning process can also be used to organize the test scripts in modules that can be easily maintained and that can be run individually to test a specific functionality. The planning module 155 can also be used to select filters that are applied in the source repository and nightly build integration engine 110.

The analytical regression test system 100 can be implemented and used in all types of environments and runtimes, including Java™, ABAP™, and Windows.NET™. The system 100 can be controlled using a web service interface. Data and scripts can be imported and exported. The system can be used to perform daily build and smoke tests. The system 100 can include a configuration tool (e.g., incorporated into the test tool framework 130, the analysis and reporting module 140, or the planning module 155) that provides an interface for importing and exporting test scripts, scheduling test scripts, performing system administration functions, and the like. The system 100 can also include an editor tool for writing scripts, including test scripts and/or scripts for implementing functions within the various components of the system 100. A history viewer can be used to show relevant information on the latest test runs in a user-friendly format.

Figure 2:
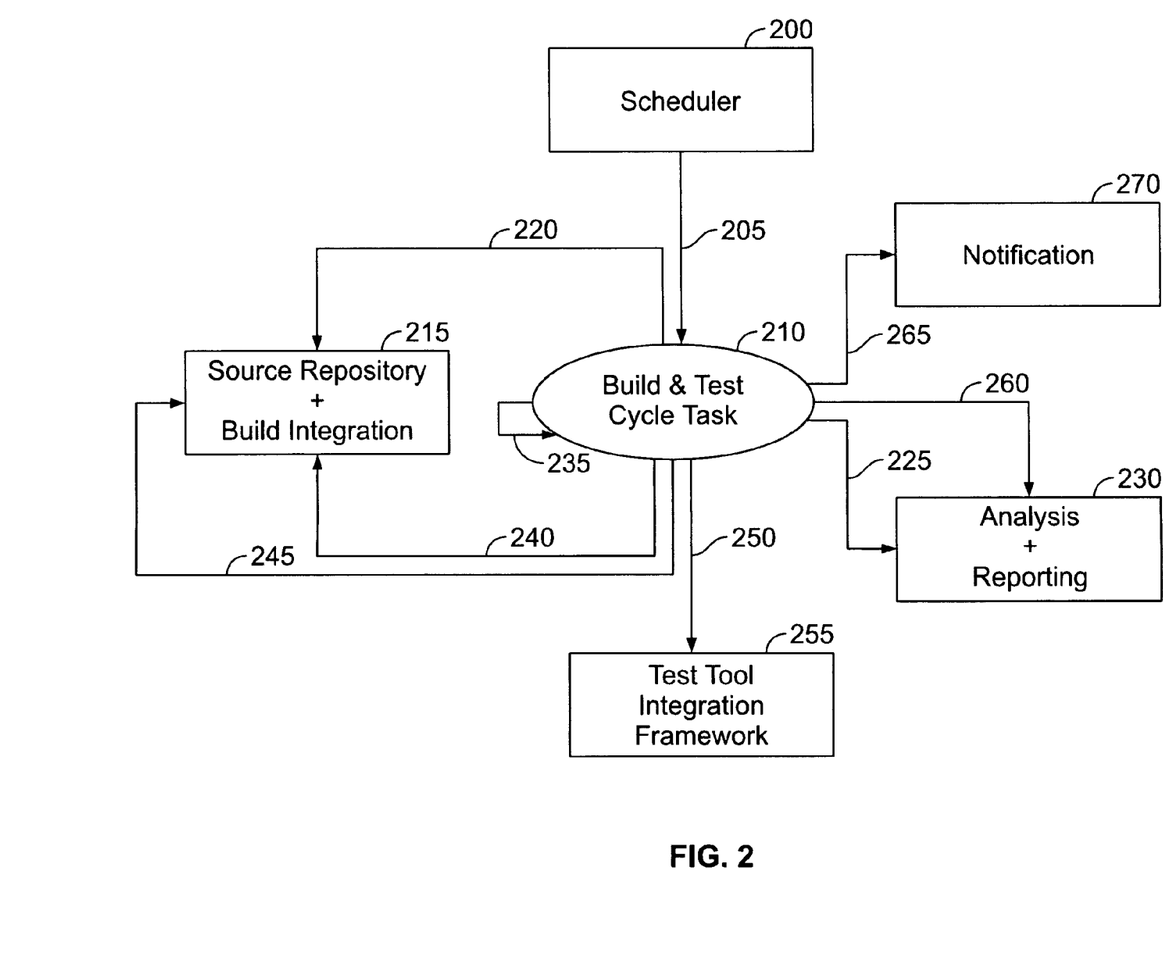
FIG. 2 is a schematic diagram of tasks initiated by a scheduler, such as the scheduling module of FIG. 1.

FIG. 2 is a schematic diagram of tasks initiated by a scheduler 200, such as the scheduling module 150 of FIG. 1. The scheduler 200 triggers (205) a build and test cycle task 210 at a specified time for a specific release of a particular software project. The software project may be an application that is in development and the specific release may be a current state of the application (i.e., including all changes since a prior release). The timing of the trigger can be determined in accordance with a testing plan for the software project and can be on a periodic basis: The build and test cycle task 210 can be implemented, for example, in the test tool integration framework 130 of FIG. 1.

In response to the trigger 205, the build and test cycle task 210 prompts (220) a source repository and build integration module 215 to synchronize the software project's sources to obtain the latest version of the sources. In addition, the build and test cycle task 210 obtains (225) a revision log for the preceding test cycle from an analysis and reporting module 230. The revision log identifies all of the sources that have been changed and, in some cases, what changes are made to the sources for one test cycle relative to the preceding test cycle. The build and test cycle task 210 increments (235) a build number associated with the obtained revision log and tags (240) the synchronized version of the sources in the source repository and build integration module 215 with the new build number. The build and test cycle task 210 then prompts (245) the source repository and build integration module 215 to generate a new build from the synchronized version of the sources.

If the build is successful, a suite of tests are performed (250) in a test tool integration framework 255. After performing the tests, or if the build is unsuccessful, a revision log associated with the new build number is compared (260) with the revision log for the preceding test cycle using the analysis and reporting module 230. The developers involved in the build cycle are notified (265) using a notification module 270 in the event of an error. The error can be identified by one or more of the tests or can be a result of an unsuccessful build. The involved developers can include all of the developers that made changes to the sources since the preceding test cycle or can include only those developers that made changes to sources that produced the errors.

Figure 3:
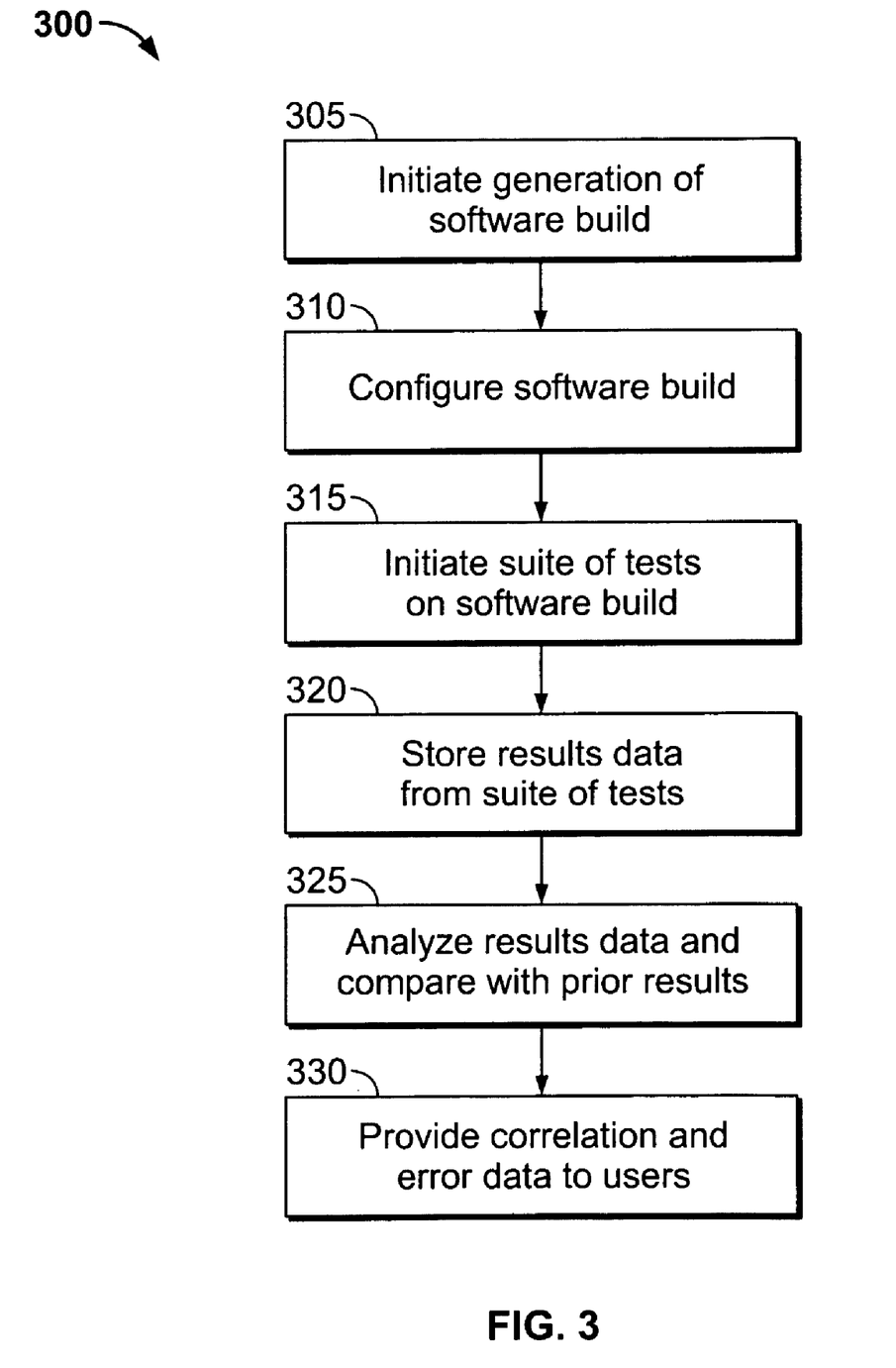
FIG. 3 is a flow diagram of a process for testing software builds.

FIG. 3 is a flow diagram of a process 300 for testing software builds. The process 300 includes initiating (305) a generation of a software build in accordance with a periodic build schedule. The software build is initiated using access to multiple sources in a source repository. The software build is configured (310) in accordance with configuration data, which can be used to ensure that each of the periodic builds have a consistent configuration. A suite of tests are initiated (315) on the software build to produce a set of results data for the software build. In some cases, each test corresponds to one or more of the source files such that the test is designed to test the one or more source files for errors. The results data is stored (320) in a repository. The results data includes output data identifying the outcome of the tests and data identifying the associated source files (e.g., identifying which source files were tested and which version of each source file was used).

The results data for the software build is analyzed and compared (325) to results data for a prior software build to identify correlations between the different sets of results data and to identify source file revisions between successive software builds that are the likely cause of errors. Information identifying the correlations and/or the errors is provided (330) to one or more users. For example, an error can be identified, and a notification can be automatically sent to a developer that produced revisions between successive builds to a source file that caused the error. Alternatively or in addition, correlations between test results for different software builds can be identified, stored, and filtered for viewing by a user in response to a user request received through a user interface.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. The operations performed by the various components can be distributed differently among the components or among additional components or can be combined in a fewer number of components. As one example, the process depicted in FIG. 2 does not require the particular order shown, or sequential order, to achieve desirable results (e.g., the operations 220, 225, 235, 240, and 260 can be performed at many different places within the overall process). In certain implementations, multitasking and parallel processing may be preferable. Other embodiments are within the scope of the following claims

What is claimed is:

1. A machine-readable storage medium storing instructions for causing data processing apparatus to perform operations comprising:
    initiating a plurality of tests on a software build, each test performed using a portion of the software build corresponding to at least one source file;
    storing results data relating to the plurality of tests, the results data further identifying source files associated with each of the plurality of tests;
    initiating more than two intermittent builds using access to a source repository, the software build comprising one of the intermittent builds, wherein the source repository is configured to store documents that the more than two intermittent builds use as data during the plurality of tests, wherein the intermittent builds are software builds and are initiated in accordance with a schedule:

initiating the plurality of tests on each of the intermittent builds using the documents to produce a set of results data for each intermittent build;

analyzing the sets of results data to identify correlations between the sets of results data as additional result data stored in a results repository in the form of correlation parameters;

filtering the data stored in the results repository in response to a user request; and sending a notification message of the correlations to user associated with the build in response to analyzing the sets of results data.

2. The article of claim 1 wherein the machine-readable medium further stores instructions for causing data processing apparatus to perform operations comprising configuring each intermittent build in accordance with stored configuration data, the stored configuration data adapted to provide a consistent configuration for different ones of the intermittent builds.

3. The article of claim 1 wherein the instructions comprise instructions written in a scripting language.

4. A computer-implemented method for testing software, the method comprising:

initiating a plurality of tests on a software build, each test performed using a portion of the software build corresponding to at least one source file;

storing results data relating to the plurality of tests, the results data further identifying source files associated with each of the plurality of tests;

initiating more than two intermittent builds using access to a source repository, the software build comprising one of the intermittent builds, wherein the source repository is configured to store documents that the more than two intermittent builds use as data during the plurality of tests, wherein the intermittent builds are software builds and are initiated in accordance with a schedule;

initiating the plurality of tests on each of the intermittent builds using the documents to produce a set of results data for each intermittent build;

analyzing the sets of results data to identify correlations between the sets of results data as additional result data stored in a results repository in the form of correlation parameters;

filtering the data stored in the results repository in response to a user request; and sending a notification message of the correlations to a user associated with the build in response to analyzing the sets of results data.

5. The method of claim 4 wherein the more than two intermittent builds use source code from the source repository storing a plurality of discrete sources, one of the intermittent builds comprising the build of the software source files.

6. The method of claim 5 wherein each intermittent build includes at least one revision to at least one of the discrete sources and the user associated with the revision comprises a developer of a discrete source that includes the revision.

7. The method of claim 4 further comprising identifying the user associated with the build based on a role associated with the user and with the correlations.

8. The method of claim 4 further comprising identifying the build based on a revision log comprising information relating to the intermittent builds since the prior build.

9. The method of claim 4 wherein initiating the more than two intermittent builds and initiating the plurality of tests on each of the intermittent builds are initiated in response to a trigger from a scheduling module.

10. The method of claim 4 wherein sending the notification message is based on a subscription associated with the user.

11. The method of claim 4, wherein the plurality of tests includes a performance test.

12. The method of claim 4, wherein the plurality of tests includes resource monitoring.

13. The method of claim 4, wherein the plurality of tests includes a quality measurement formed as an n-dimensional space.

14. A testing system including a digital computer, the testing system comprising:

a memory device that is configured as a source repository to store intermittent builds; and a processor that is configured to initiate a plurality of tests on a software build, each test performed using a portion of the software build corresponding to at least one source file, wherein the memory device is further configured to store results data relating to the plurality of tests, the results data further identifying source files associated with each of the plurality of tests, wherein the processor is further configured to initiate more than two of the intermittent builds using access to the source repository, the software build comprising one of the intermittent builds, wherein the source repository is configured to store documents that the more than two intermittent builds use as data during the plurality of tests, wherein the intermittent builds are software builds and are initiated in accordance with a schedule, wherein the processor is further configured to initiate the plurality of tests on each of the intermittent builds using the documents to produce a set of results data for each intermittent build, wherein the processor is further configured to analyze the sets of results data to identify correlations between the sets of results data as additional result data stored in a results repository in the form of correlation parameters, wherein the processor is further configured to filter the data stored in the results repository in response to a user request, and wherein the processor is further configured to send a notification message of the correlations to user associated with the build in response to analyzing the sets of results data.

15. The testing system of claim 14, wherein the plurality of tests includes a performance test.

16. The testing system of claim 14, wherein the plurality of tests includes resource monitoring.

17. The testing system of claim 14, wherein the plurality of tests includes an application programming interface test.

18. The testing system of claim 14, wherein the correlations include a correlation between an error type and a day of a week.

19. The testing system of claim 14, wherein the plurality of tests includes a quality measurement related to a user interface.

20. The testing system of claim 14, wherein the plurality of tests includes a quality measurement formed as an n-dimensional space.

* * * * *